US010281024B1

United States Patent
Bennett

(10) Patent No.: US 10,281,024 B1
(45) Date of Patent: *May 7, 2019

(54) DRIVE ASSEMBLY

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/369,113

(22) Filed: Dec. 5, 2016

Related U.S. Application Data

(60) Continuation of application No. 14/684,034, filed on Apr. 10, 2015, now Pat. No. 9,512,914, which is a continuation of application No. 14/290,645, filed on May 29, 2014, now Pat. No. 9,003,902, which is a division of application No. 12/853,978, filed on Aug. 10, 2010, now Pat. No. 8,739,905.

(60) Provisional application No. 61/232,616, filed on Aug. 10, 2009.

(51) Int. Cl.
| | |
|---|---|
| B60K 17/28 | (2006.01) |
| B60K 25/06 | (2006.01) |
| F16H 47/02 | (2006.01) |
| F16H 57/04 | (2010.01) |
| F16H 57/023 | (2012.01) |
| F16H 57/028 | (2012.01) |
| F16H 57/02 | (2012.01) |

(52) U.S. Cl.
CPC ........... *F16H 57/023* (2013.01); *B60K 17/28* (2013.01); *B60K 25/06* (2013.01); *F16H 47/02* (2013.01); *F16H 57/028* (2013.01); *F16H 57/0424* (2013.01); *B60K 2025/065* (2013.01); *F16H 2057/02052* (2013.01); *F16H 2057/02082* (2013.01); *F16H 2057/02086* (2013.01); *Y10T 74/19149* (2015.01); *Y10T 74/19242* (2015.01)

(58) Field of Classification Search
CPC .. F16H 57/023; F16H 57/028; F16H 57/0424; F16H 47/02; F16H 2057/02052; F16H 2057/02082; F16H 2057/02086; B60K 25/06; B60K 17/28; B60K 2025/065; B60K 6/54; B60K 6/543; Y10T 74/19149; Y10T 74/19242
See application file for complete search history.

(56) References Cited

U.S. PATENT DOCUMENTS

| | | | |
|---|---|---|---|
| 1,338,777 | A | 5/1920 | Johnson |
| 1,386,396 | A | 8/1921 | Cornelison |
| 1,840,872 | A | 1/1932 | Rayburn |
| 2,537,060 | A | 1/1951 | Keese |

(Continued)

*Primary Examiner* — Laura Freedman
(74) *Attorney, Agent, or Firm* — Neal, Gerber & Eisenberg, LLP

(57) ABSTRACT

A drive assembly is disclosed, with a variable speed transmission in a housing. A pair of clutch assemblies are engaged to a transmission output shaft, and engaged to and selectively driving a pair of axle shafts. A power take off includes a power take off output shaft and a clutch/brake mechanism. A first and a second output gears are driven by the transmission output shaft and disposed on a first and second jack shafts, respectively. A first intermediate gear is disposed on a third jack shaft and driven by the first output gear, and a second intermediate gear is disposed on a fourth jack shaft.

21 Claims, 12 Drawing Sheets

(56) References Cited

U.S. PATENT DOCUMENTS

| | | | |
|---|---|---|---|
| 2,578,584 | A | 12/1951 | Osborn |
| 2,692,516 | A | 10/1954 | O'Leary |
| 3,360,933 | A | 1/1968 | Swanson et al. |
| 3,424,032 | A | 1/1969 | Kaspar |
| 3,435,928 | A | 4/1969 | Frederick |
| 3,486,335 | A | 12/1969 | Richard et al. |
| 3,687,212 | A | 8/1972 | Forster |
| 3,817,403 | A | 6/1974 | Glachet et al. |
| 3,915,030 | A | 10/1975 | Ritter |
| 4,574,902 | A * | 3/1986 | Irimajiri ............... B60K 17/306 180/312 |
| 4,589,249 | A | 5/1986 | Walker et al. |
| 4,658,662 | A | 4/1987 | Rundle |
| 5,099,936 | A | 3/1992 | Irikura et al. |
| 5,201,692 | A | 4/1993 | Johnson et al. |
| 5,314,387 | A | 5/1994 | Hauser et al. |
| 5,392,670 | A | 2/1995 | Hauser |
| 5,540,119 | A | 7/1996 | Hudson |
| 5,544,547 | A | 8/1996 | Ishimaru |
| 5,697,264 | A | 12/1997 | Andrews et al. |
| 5,947,218 | A | 9/1999 | Ishimaru |
| 6,098,385 | A | 8/2000 | Turk |
| 6,122,996 | A | 9/2000 | Hauser et al. |
| 6,266,598 | B1 | 7/2001 | Pillar et al. |
| 6,301,885 | B1 | 10/2001 | Johnson et al. |
| 6,457,546 | B1 | 10/2002 | Ishimaru et al. |
| 6,643,959 | B2 | 11/2003 | Jolliff et al. |
| 6,651,529 | B1 | 11/2003 | Poplawsli et al. |
| 6,758,290 | B2 * | 7/2004 | Jolliff ..................... F16H 47/02 180/307 |
| 6,957,531 | B1 | 10/2005 | Phanco et al. |
| 6,983,815 | B2 | 1/2006 | Abend et al. |
| 6,986,406 | B1 | 1/2006 | Hauser et al. |
| 7,036,311 | B2 | 5/2006 | Hauser et al. |
| 7,040,092 | B1 | 5/2006 | Buescher |
| 7,059,991 | B2 | 6/2006 | Puiu |
| 7,073,330 | B1 | 7/2006 | Hauser |
| 7,077,778 | B1 | 7/2006 | Irikura |
| 7,089,824 | B2 | 8/2006 | Nakatani et al. |
| 7,137,250 | B1 | 11/2006 | McCoy et al. |
| 7,222,485 | B2 | 5/2007 | Shibata et al. |
| 7,225,704 | B2 | 6/2007 | Ishii et al. |
| 7,338,403 | B2 | 3/2008 | Puiu |
| 7,357,750 | B2 | 4/2008 | Okada |
| 7,367,353 | B1 | 5/2008 | Langenfeld et al. |
| 7,455,130 | B2 | 11/2008 | Irikura |
| 7,487,608 | B2 | 2/2009 | Yamazaki et al. |
| 7,493,711 | B2 | 2/2009 | Gautreau et al. |
| 7,497,082 | B1 | 3/2009 | Bennett et al. |
| 7,503,172 | B2 | 3/2009 | Sakakura et al. |
| 7,540,102 | B2 | 6/2009 | Olmr et al. |
| 7,577,507 | B2 | 8/2009 | Morris |
| 7,788,919 | B2 | 9/2010 | Ohashi et al. |
| 7,841,176 | B1 | 11/2010 | Langenfeld et al. |
| 7,913,799 | B2 | 3/2011 | Kawashiri et al. |
| 7,926,624 | B1 | 4/2011 | Taylor |
| 7,927,245 | B1 | 4/2011 | Langenfeld et al. |
| 7,988,582 | B1 | 8/2011 | Hauser |
| 8,046,992 | B2 | 11/2011 | Abend et al. |
| 8,161,834 | B2 | 4/2012 | Steffens |
| 8,251,868 | B2 | 8/2012 | Ichikawa et al. |
| 8,313,405 | B2 | 11/2012 | Bazyn et al. |
| 8,313,407 | B2 | 11/2012 | Ekonen et al. |
| 8,313,408 | B1 | 11/2012 | Langenfeld |
| 8,393,236 | B1 | 3/2013 | Hauser et al. |
| 8,443,598 | B1 | 5/2013 | Hauser et al. |
| 8,464,610 | B1 | 6/2013 | Langenfeld et al. |
| 8,479,503 | B2 | 7/2013 | Abend et al. |
| 8,534,060 | B1 | 9/2013 | Bennett et al. |
| 8,689,551 | B1 | 4/2014 | Phanco et al. |
| 8,739,905 | B1 | 6/2014 | Bennett |
| 9,003,902 | B1 | 4/2015 | Bennett |
| 9,109,684 | B1 | 8/2015 | Langenfeld et al. |
| 9,512,914 | B1 * | 12/2016 | Bennett ................... B60K 17/28 |
| 2005/0070391 | A1 | 3/2005 | Folsom et al. |
| 2007/0209456 | A1 | 9/2007 | Irikura et al. |
| 2008/0018267 | A1 | 1/2008 | Arakawa et al. |
| 2008/0018269 | A1 | 1/2008 | Wyatt et al. |
| 2008/0041048 | A1 | 2/2008 | Kanenobu et al. |
| 2010/0147097 | A1 | 6/2010 | Kim et al. |
| 2012/0297757 | A1 | 11/2012 | Kamikawa |

* cited by examiner

DRIVE ASSEMBLY

CROSS-REFERENCE

This application is a continuation of U.S. application Ser. No. 14/684,034, filed Apr. 10, 2015, now U.S. Pat. No. 9,512,914, which is a continuation of U.S. application Ser. No. 14/290,645, filed on May 29, 2014, now U.S. Pat. No. 9,003,902, which was a divisional of U.S. application Ser. No. 12/853,978, filed on Aug. 10, 2010, now U.S. Pat. No. 8,739,905, which claims the benefit of U.S. Provisional App. No. 61/232,616, filed on Aug. 10, 2009. These prior applications are incorporated herein by reference in their entirety.

BACKGROUND OF THE INVENTION

This invention relates to a drive assembly for use in driving, for example, a snow thrower including an auger.

SUMMARY OF THE INVENTION

An improved drive assembly is disclosed herein, including a variable speed transmission and a pair of clutch assembles to separately power a pair of drive axles, in combination with a power take off ("PTO") drive for powering, for example, an auger. The drive assembly provided herein thereby allows for a lighter and more compact unit.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
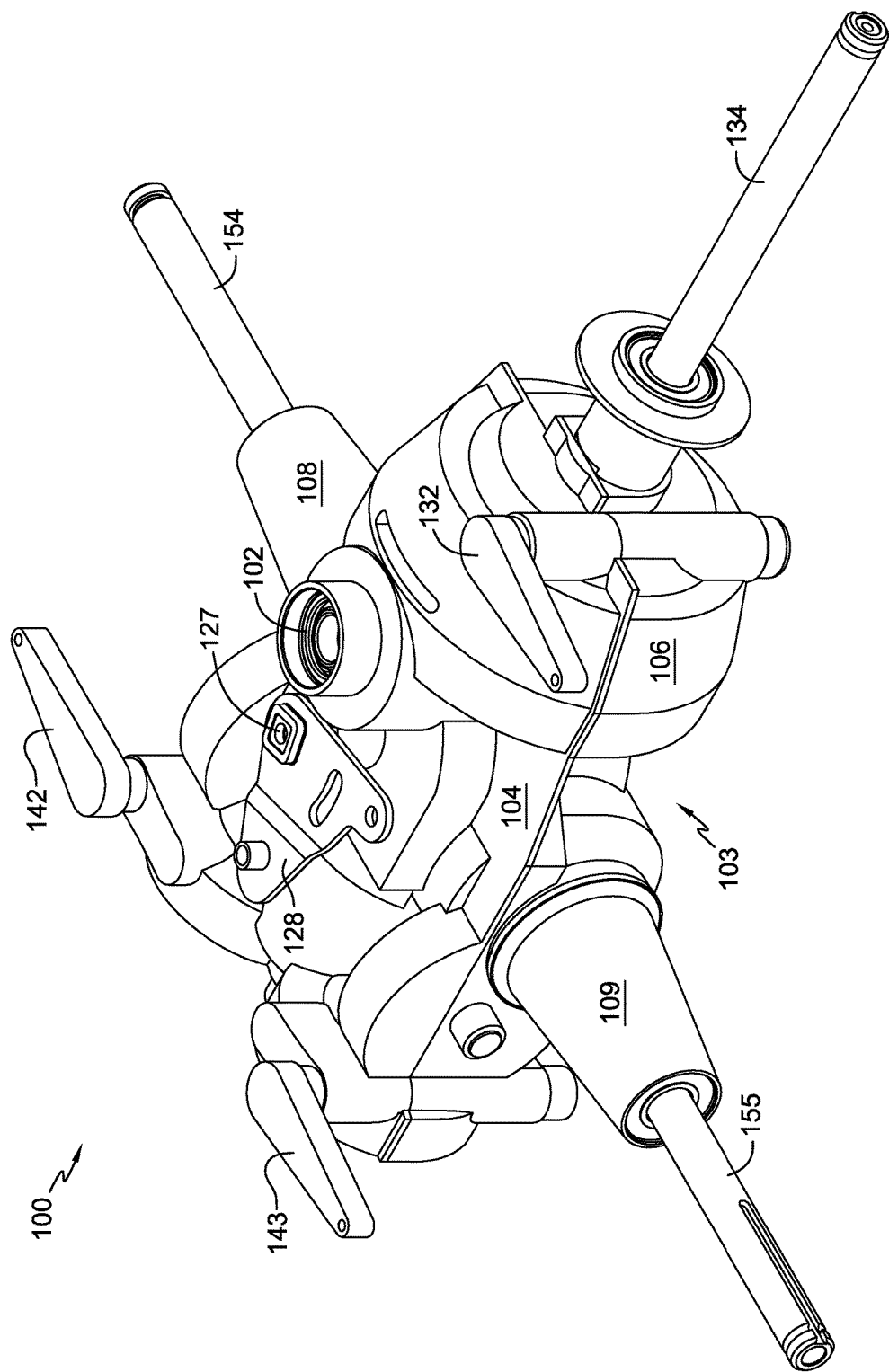
FIG. 1 is a perspective view of a drive assembly in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a clearer description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Drive assembly 100 as shown in FIGS. 1-7 includes an external housing 103 comprising two housing elements 104, 106 joined along a split line that is generally parallel to the longitudinal axes of axle shafts 154 and 155, pump input shaft 116, motor shaft 136, and PTO output shaft 134. The details of drive assembly 100 are more clearly shown in FIG. 2, which is a top plan view of the unit with housing element 104 removed. The depicted embodiment shows a variable speed transmission in the form of a hydraulic transmission disposed in sump 110 formed in housing 103. However, it will be appreciated by those in the art that the scope of the present invention includes those embodiments in which the variable speed transmission comprises other types, including but not limited to toroidal, friction and gear drives.

Drive assembly 100 is configured to directly receive a vertical output shaft (not shown) from a prime mover (not shown), such as an internal combustion engine, electric motor or the like. The vertical output shaft (not shown) engages and drives an input shaft 112. As depicted, for example, in FIG. 6, input shaft 112 is integrally formed with bevel gear 112a of drive assembly 100. However, bevel gear 112a could optionally be separately formed from input shaft 112. Input shaft 112 passes through input shaft bearing 102 and is drivingly engaged by means of bevel gear 112a to bevel gear 114 mounted on pump input shaft 116, which drives a pump cylinder block 122 at a first end and provides rotational input to a clutch/brake assembly 130 at a second end.

Figure 10:
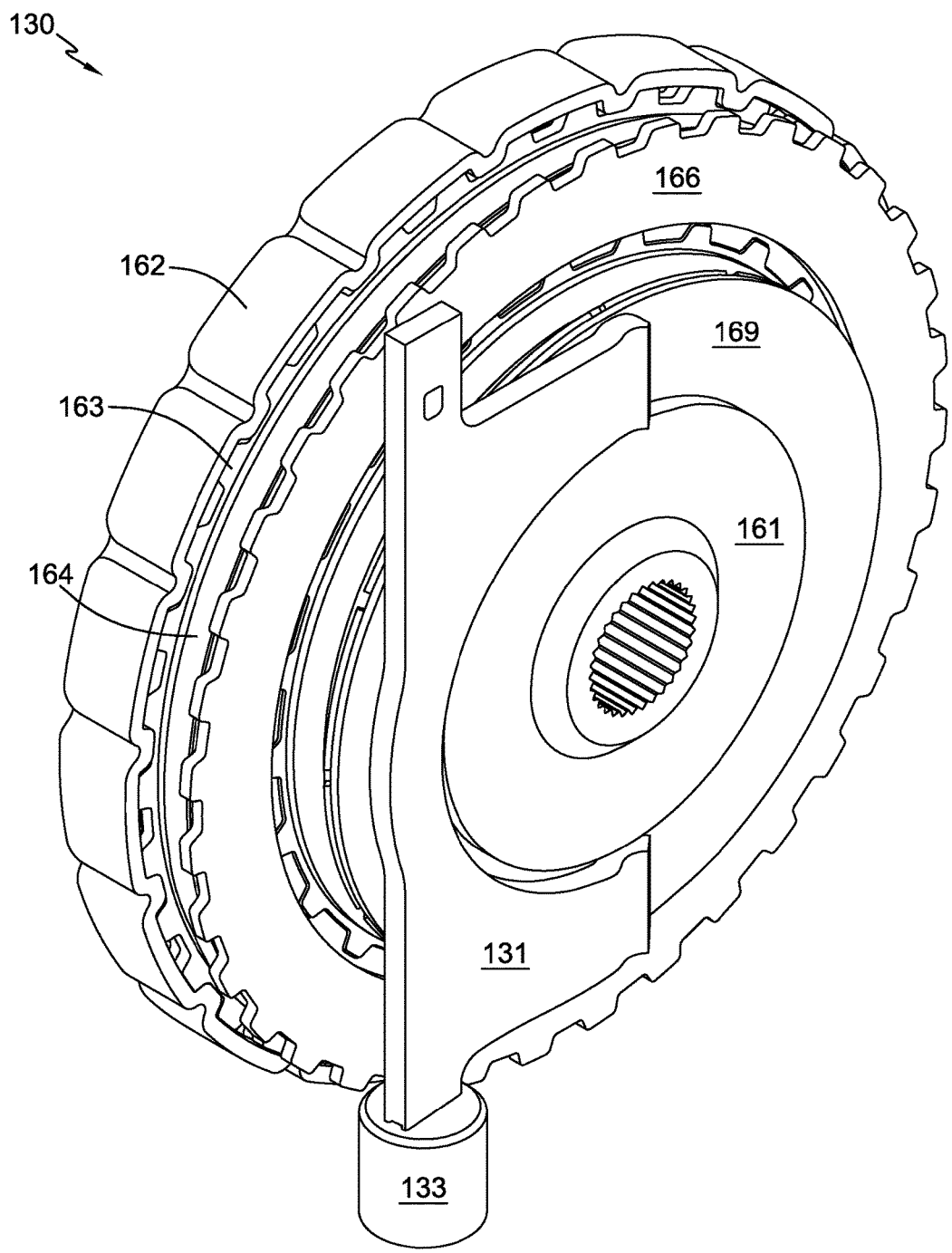
FIG. 10 is a perspective view of the PTO clutch/brake assembly shown in FIG. 2.
Figure 11:
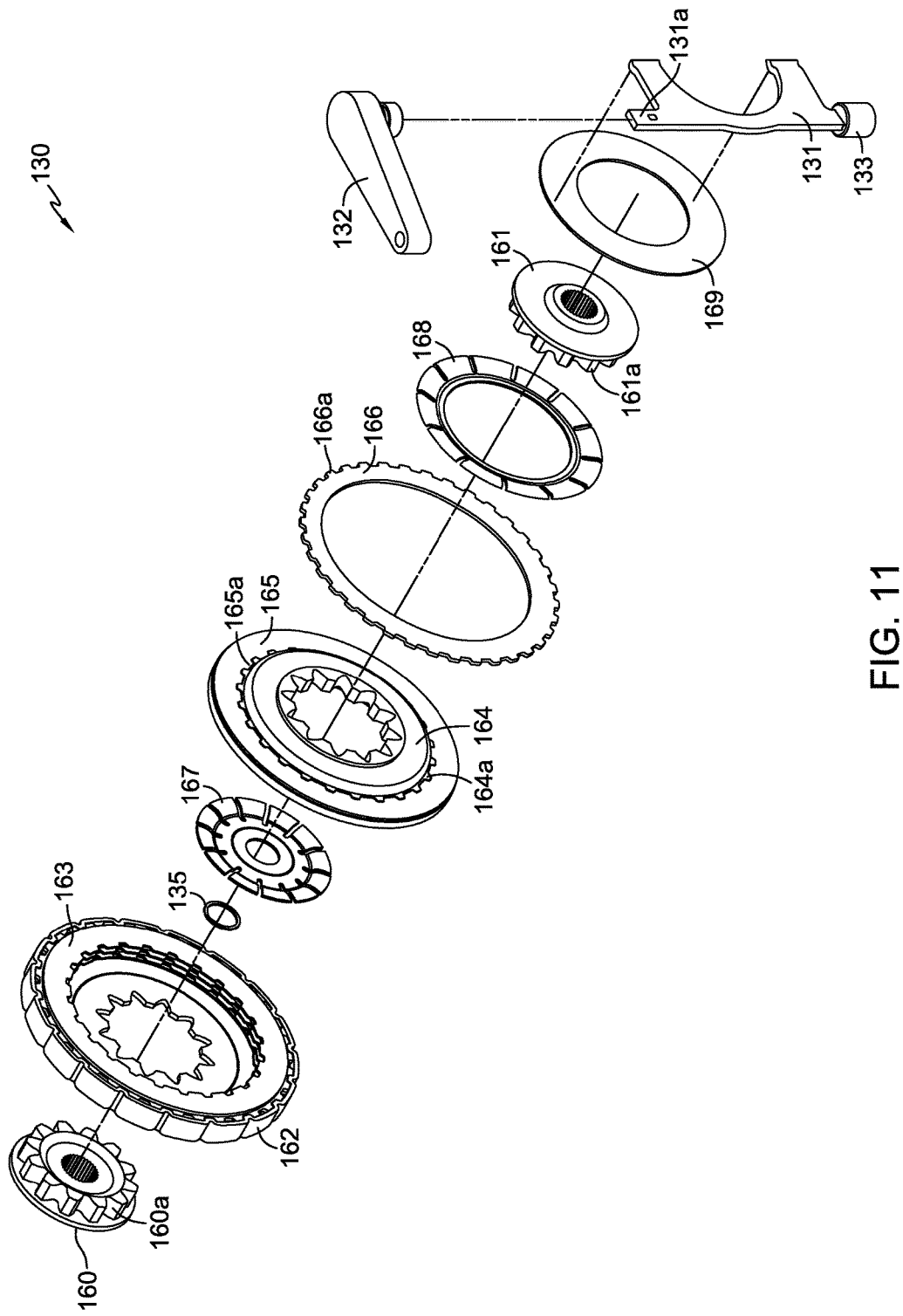
FIG. 11 is an exploded view of the PTO clutch/brake assembly shown in FIG. 10.

Clutch/brake assembly 130 regulates operation of a PTO apparatus. PTO output shaft 134 is supported by bearings 118 in housing 103 and engages the clutch and brake mechanisms of clutch/brake assembly 130 by means of output hub 161, which is fixed on PTO output shaft 134. Clutch/brake assembly 130 is shown in greater detail in FIGS. 10 and 11 as a wet mechanical clutch having clutch actuation fork 131 with projection 131a to engage PTO actuation arm 132. A similar projection (not shown) at the opposite end of clutch actuation fork 131 engages a pivot end 133, which is rotationally supported by a pocket (not shown) in housing element 106.

The depicted clutch/brake assembly 130 is designed so that the PTO output shaft 134 is normally biased to a braked state until actuation arm 132 is rotated. Brake stator 166 has teeth 166*a* formed on its outer periphery that mate with corresponding indentations or projections in housing 103 (not shown). This mating prevents rotation of brake stator 166 with respect to housing 103.

Brake rotor 165 is disposed on carrier 164 and has teeth 165*a* on its inner periphery that mate with corresponding teeth 164*a* on carrier 164. Brake bias spring 167, which is retained in position by retaining ring 135, bears upon carrier 164 and serves to bias the brake rotor 165 toward frictional engagement with brake stator 166. In this manner, clutch/brake assembly 130 is biased to the braked state. Carrier 164 is mated to output hub 161 via gear form 161*a*, and as stated above, output hub 161 is fixed on PTO output shaft 134. Because the frictional engagement with brake stator 166 arrests rotation of carrier 164, any rotation of output hub 161, as well as PTO output shaft 134, is also arrested.

When PTO actuation arm 132 is rotated, clutch actuation fork 131 contacts and bears upon washer 169. Washer 169 in turn contacts clutch spring 168 and bears upon it. Clutch spring 168 acts to ensure that excessive force or pressure is not applied to clutch plate stack 163 by carrier 164, thereby extending the service life of the wet clutch plates. In moderating the force applied by clutch actuation fork 131, clutch spring 168 acts on carrier 164, which moves against and overcomes the bias force of brake bias spring 167 and bears upon clutch plate stack 163. By this action, PTO output shaft 134 becomes disengaged from brake stator 166, and the driving engagement of PTO output shaft 134 and cage 162 is initiated.

Clutch input hub 160 is fixed to pump input shaft 116, and is also mated to cage 162 through gear form 160*a*. It will be appreciated by those in the art that the mating surfaces of cage 162 and clutch input hub 160 described here as a "gear form" may take other forms such as a tooth or spline form. As such, whenever the prime mover (not shown) is supplying power to drive assembly 100, cage 162 is driven by the rotation of pump input shaft 116. Clutch plate stack 163, which is disposed within cage 162, comprises two types of clutch plates. The first type comprises a plurality of teeth forms extending from the interior periphery of the clutch plate and are engaged to carrier 164. The second type comprises a plurality of teeth forms extending from the exterior periphery of the clutch plate and are engaged to and driven by cage 162. The first type of clutch plates are alternately disposed between the second type of clutch plates. When clutch actuation fork 131 rotates, the movement of carrier 164 under the influence of clutch actuation fork 131 brings the first type of clutch plates into frictional engagement with the second type of clutch plates, which causes the first type of clutch plates to rotate with cage 162 through the second type of clutch plates, transferring rotation and torque from cage 162 to PTO output shaft 134. Clutches of other design, e.g. other mechanical clutches, electrical clutches, or hydraulic clutches (not shown), may alternatively be used.

PTO output shaft 134 can be used to drive an implement such as a snow thrower auger (not shown) and blower (not shown). The layout of the present design permits PTO output shaft 134 to be collinear with pump input shaft 116 and motor output shaft 136, thereby permitting a particularly low profile unit. The mounting of clutch/brake assembly 130 and PTO output shaft 134 in a common housing 103 with the drive elements of drive assembly 100 also minimizes the overall size of the unit.

The drive portion of drive assembly 100 comprises a variable speed transmission which, in the depicted embodiment, is a hydrostatic transmission. A transaxle incorporating a hydrostatic transmission and design used in a snow thrower is shown in commonly-owned U.S. Pat. No. 6,651,529, the terms of which are incorporated herein by reference.

In the depicted embodiment, center section 120 is disposed in housing 103. Pump cylinder block 122 and motor cylinder block 124 are disposed on center section 120 and are hydraulically connected to one another through porting formed in center section 120. As noted, pump input shaft 116 is engaged to and driven by bevel gear 114, and pump input shaft 116 is engaged to and drives pump cylinder block 122. Pump input shaft 116 is supported by center section 120 at one end and by bearing 119 proximate to its other end. Pump cylinder block 122, motor cylinder block 124 and their accompanying pistons can be of a standard design for an axial piston hydrostatic transmission, as is shown in commonly-owned U.S. Pat. No. 6,651,529. A rotatable swash plate 126 controlled by integrally formed trunnion 127 and external control arm 128 operate to control the output of the hydrostatic transmission as is known in the art.

Figure 8:
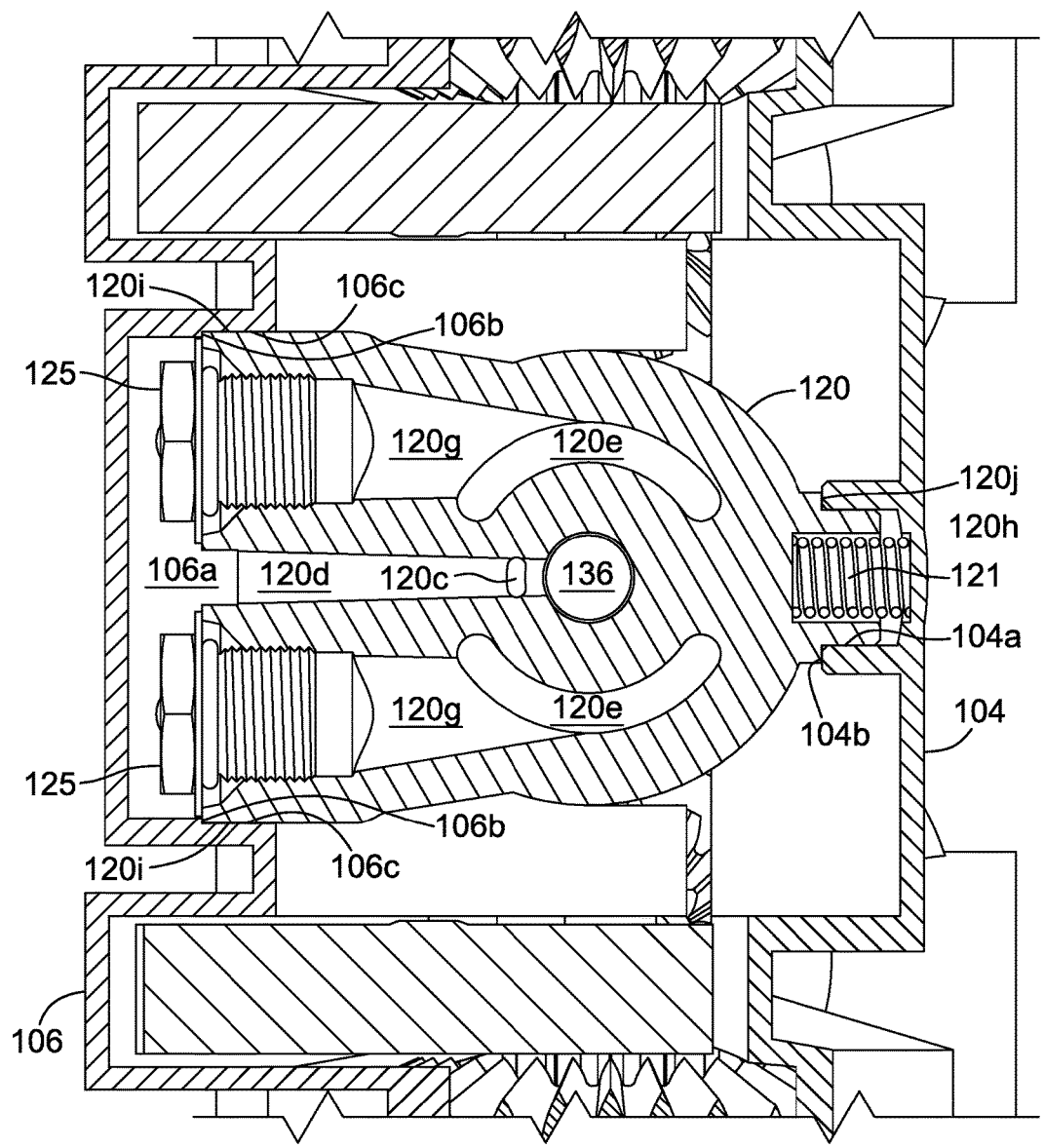
FIG. 8 is a cross-sectional view of the drive assembly along the line 8-8 in FIG. 7.
Figure 9:
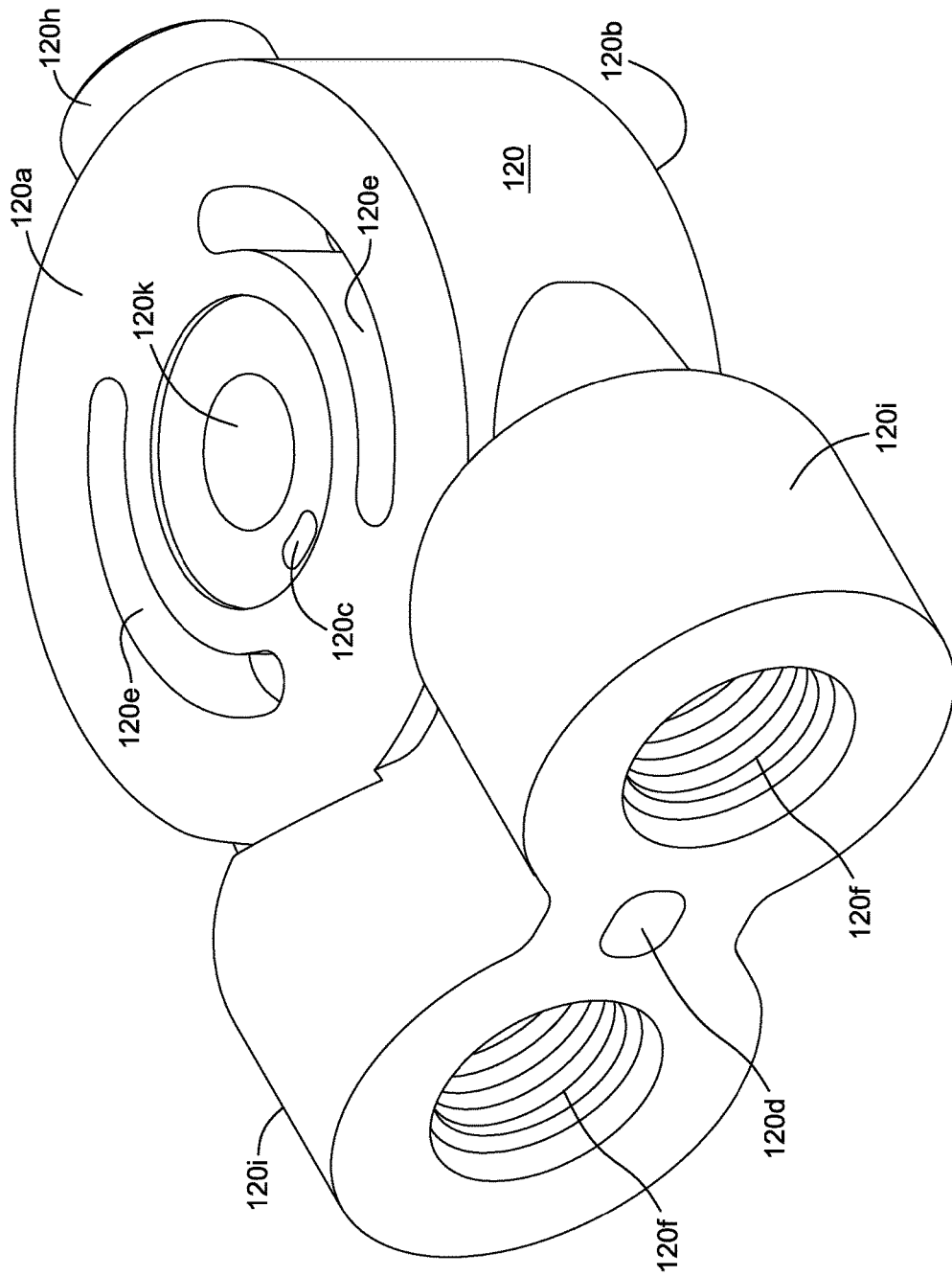
FIG. 9 is a perspective view of the center section of the drive assembly of FIG. 1.

Center section 120 is shown in greater detail in FIGS. 8 and 9. Center section 120 has pump running surface 120*a* on which pump cylinder block 122 is disposed. Kidney through-ports 120*e* permit passage of hydraulic fluid through center section 120 to motor running surface 120*b* and motor cylinder block 124 disposed thereon to complete a hydraulic circuit. Block drain 120*c* allows passage of hydraulic fluid into common block drain and shafts lubrication passage 120*d*, simultaneously preventing block lift of the pump cylinder block 122 and motor cylinder block 124, while providing additional lubrication to pump input shaft 116 and motor output shaft 136. Check plugs 125 are disposed in check plug ports 120*f* to regulate flow through check plug passages 120*g*. Shaft-support opening 120*k*, which serves as a bearing surface, extends through center section 120 to receive both pump input shaft 116 and motor output shaft 136.

Center section 120, which does not use fasteners to secure its position in housing 103, has several features which maintain its proper positioning. These features are located in both housing elements 104 and 106, and work in concert to trap center section 120 between them. During assembly of drive assembly 100, center section 120 is inserted into pocket 106*a* formed in housing 106 and abuts locator stops 106*b*. In proximity to check plug passages 120*f* are alignment profiles 120*i*, which interface with mating alignment profiles 106*c* formed in pocket 106*a* to locate and restrain center section 120. On the opposing end of center section 120 is located protrusion 120*h*, which is inserted into pocket 104*a* of housing 104 to further locate and restrain center section 120. Locator stop 120*j*, formed adjacent to protrusion 120*h*, abuts against outer abutment surface 104*b* of pocket 104*a* to further locate and restrain center section 120. Protrusion 120*h* prevents rotation of center-section 120 that would be caused by rotational forces imparted by the rotation of pump input shaft 116 and motor output shaft 136 because of their contact with center section 120. Vibration dampening spring 121, which is optional, bears on center section 120 and can be included to dampen any vibration caused by operation of drive assembly 100.

Figure 2:
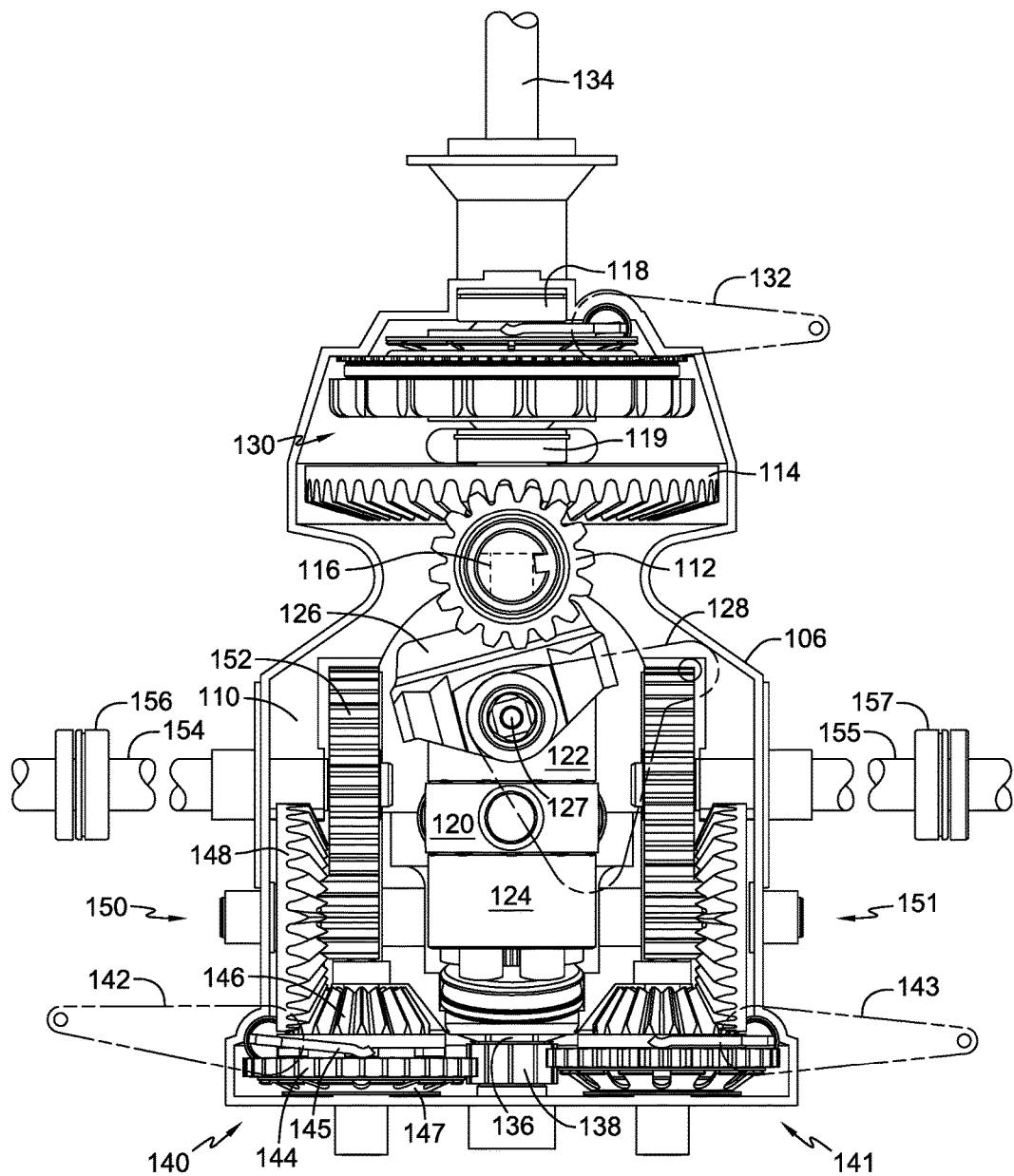
FIG. 2 is a top plan view of the drive assembly of FIG. 1, with one housing element removed.
Figure 3:
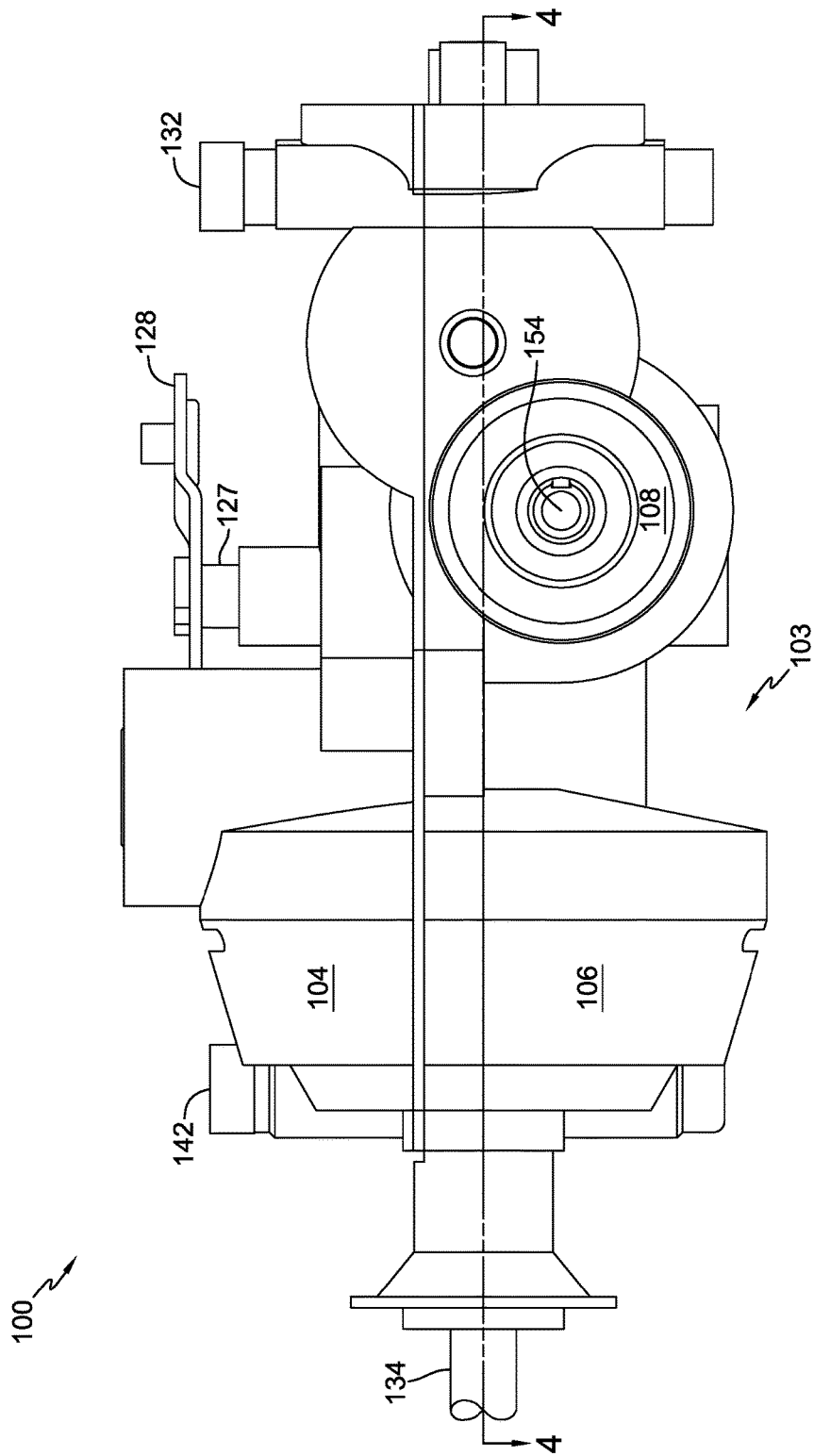
FIG. 3 is a side elevational view of the drive assembly of FIG. 1.
Figure 4:
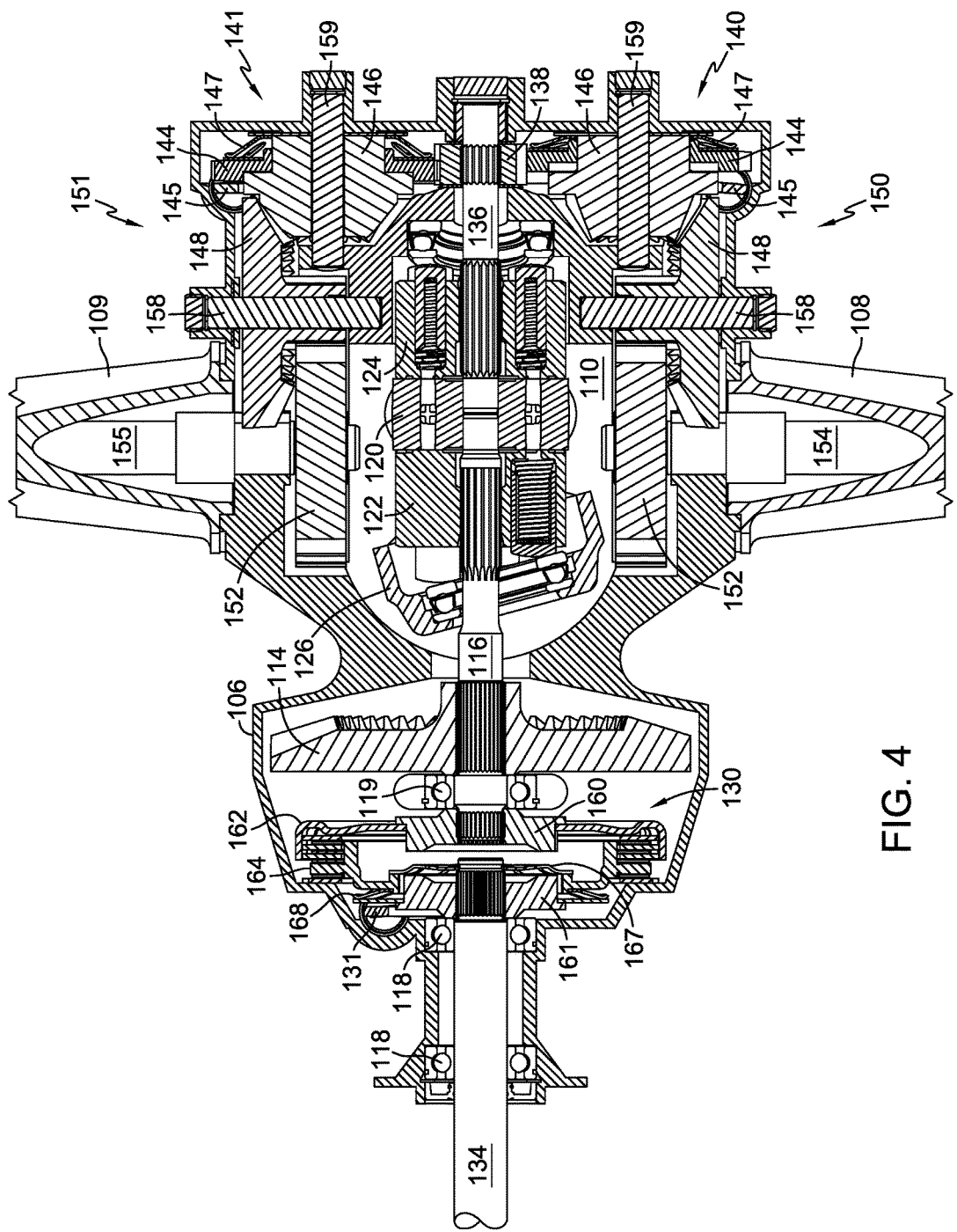
FIG. 4 is a cross-sectional view of the drive assembly along the line 4-4 in FIG. 3.
Figure 5:
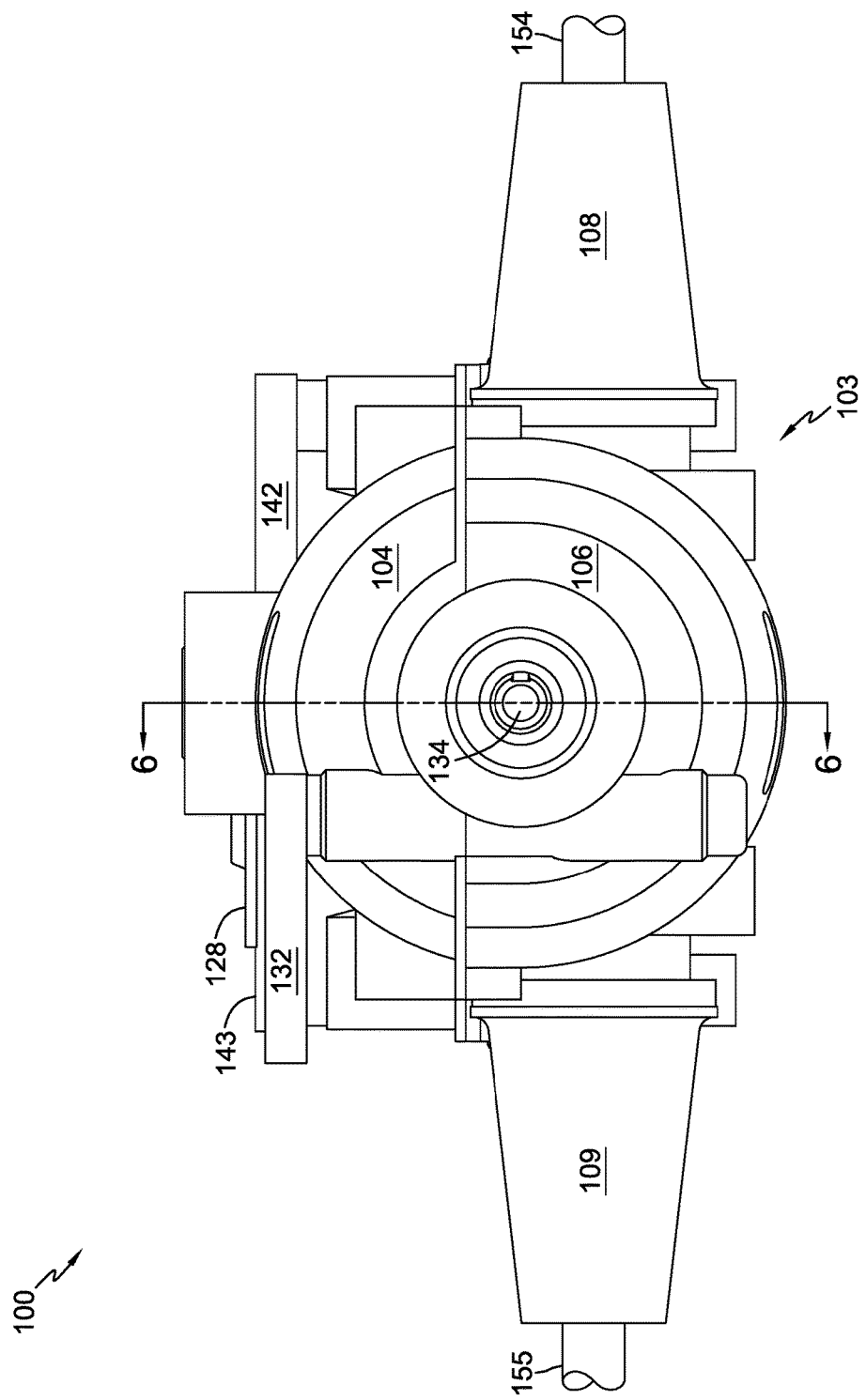
FIG. 5 is a front elevational view of the drive assembly of FIG. 1.
Figure 6:
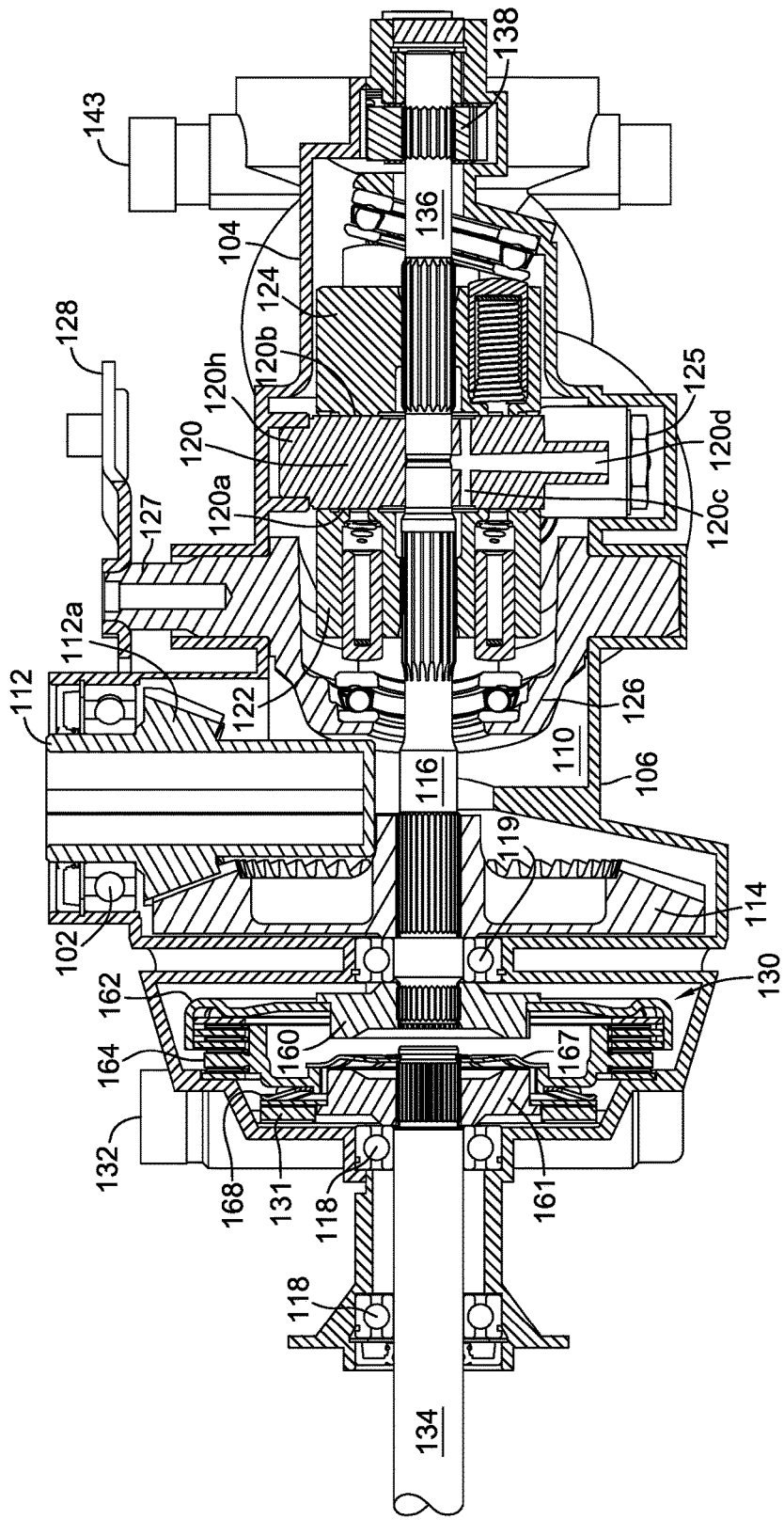
FIG. 6 is a cross-sectional view of the drive assembly along the line 6-6 in FIG. 5.

As illustrated in FIGS. 2, 4 and 6, motor cylinder block 124 is engaged to and drives motor output shaft 136. Motor output shaft 136 is supported by center section 120 and by a bearing in housing 106. A pinion spur gear 138 is disposed on motor output shaft 136 and is engaged to and drives a pair of input spur gears 144 which are part of the clutch assembles 140 and 141. This gear combination may serve as a first reduction stage, depending on the scaling of the respective gears for a given application.

For the sake of simplicity, only the left side clutch assembly 140, gear train 150 and axle 154 will be described in detail herein. The right side clutch assembly 141, including gear train 151 and axle 155, can be substantially identical in form and function.

Gear train 150 comprises spur and bevel combination gear 148 engaged to and driving spur gear 152, which is fixed to axle shaft 154. This gear combination may serve as a final reduction stage. When the clutch assembly 140 is engaged, output bevel gear 146 drives spur and bevel combination gear 148, providing a gear reduction. Gear 148 in turn is engaged to and drives a spur gear 152 fixed to axle shaft 154. Jack shafts 158 and 159, which rotationally support spur and bevel combination gear 148 and output bevel gear 146 respectively, are inserted into housing element 106 through various plugged openings visible in FIGS. 1 and 4 to facilitate assembly.

Figure 7:
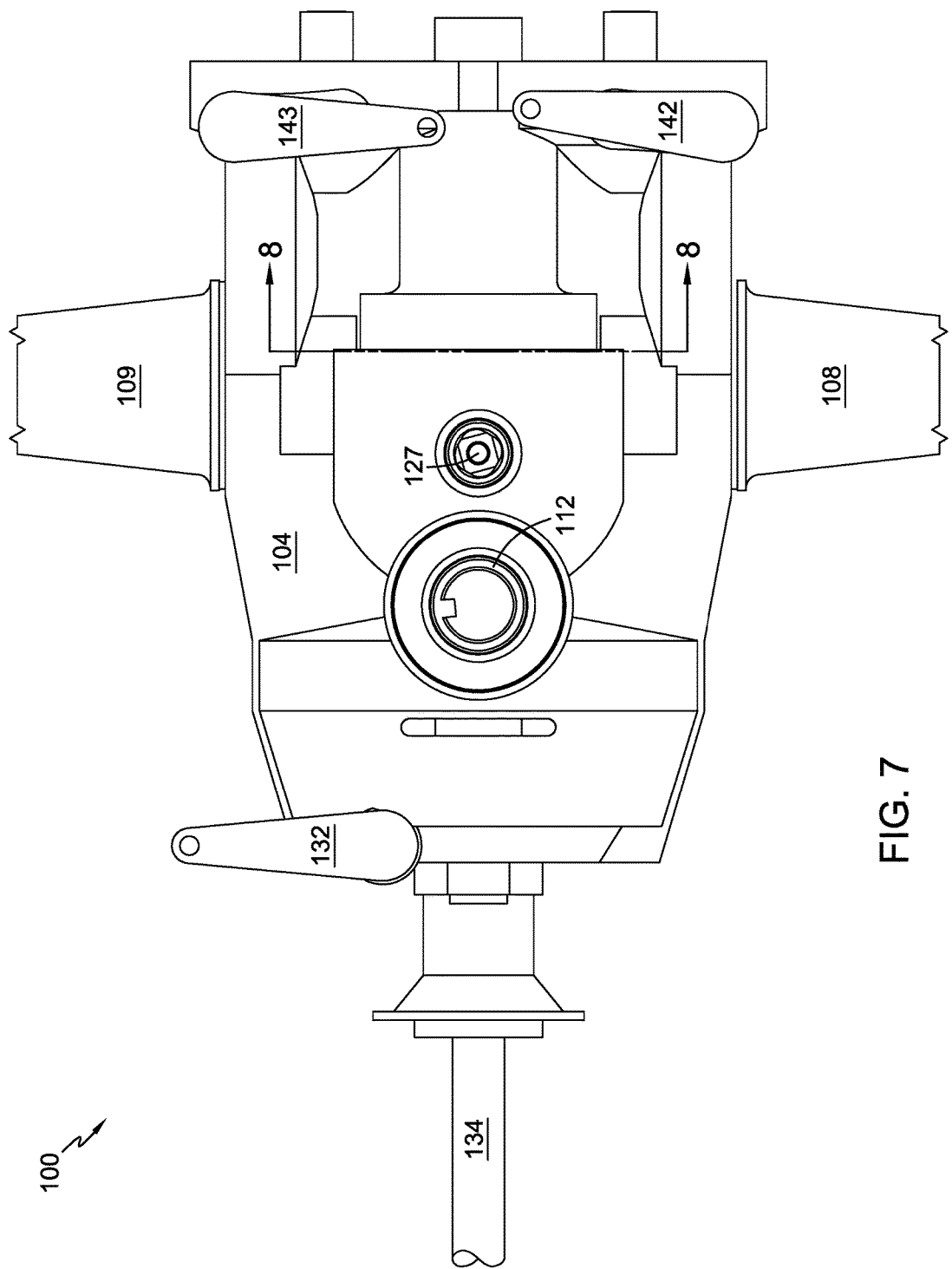
FIG. 7 is a top plan view of the drive assembly of FIG. 1.
Figure 12:
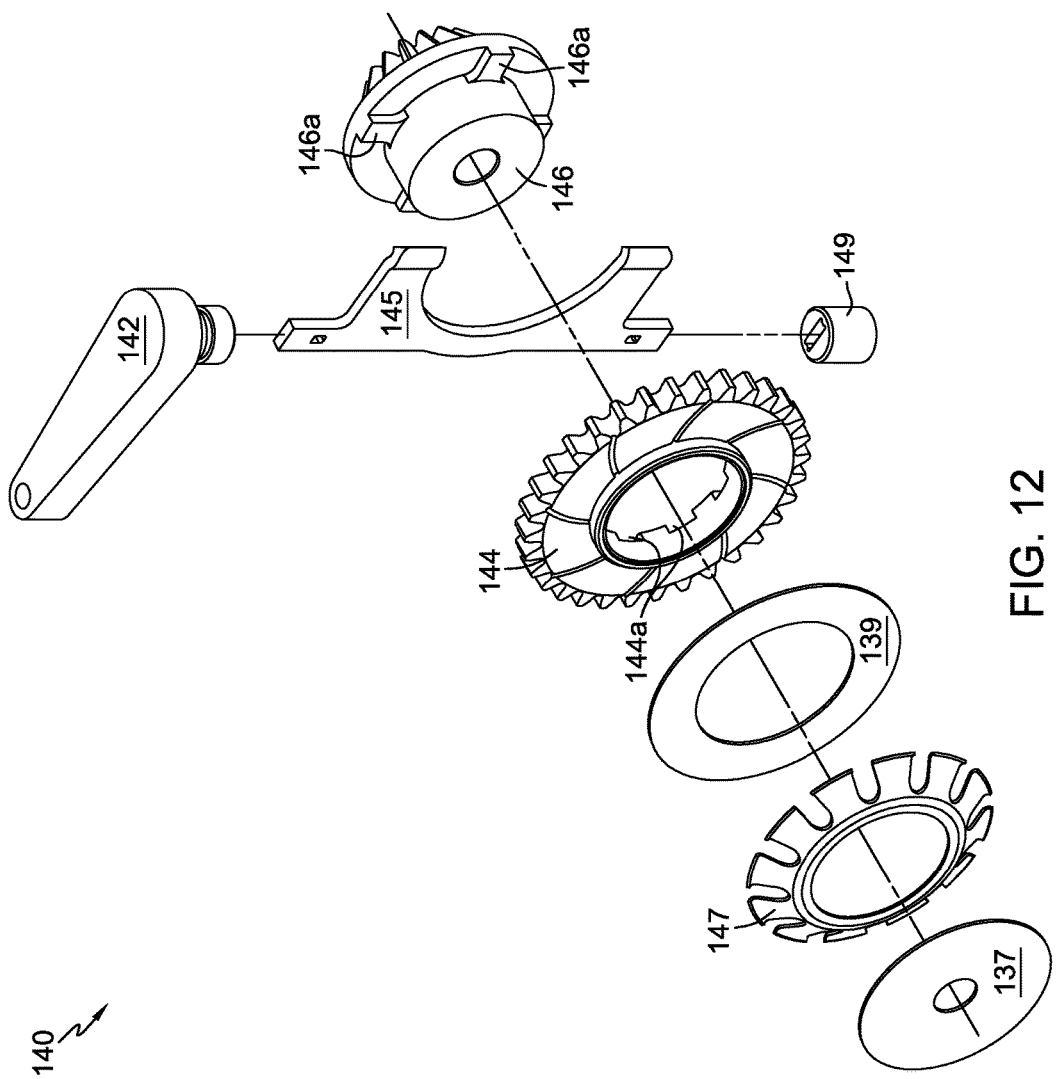
FIG. 12 is an exploded view of one of the clutch assemblies that transfers power from the transmission to the gear train of the drive assembly.

Unlike the PTO clutch/brake assembly 130 previously detailed, clutch assembly 140 is normally biased to an engaged state. Clutch assembly 140, however, is depicted in a disengaged state in FIGS. 2 and 4 via rotation of clutch actuation arm 142. It should be noted in these same figures that clutch assembly 141 is depicted in an engaged state. Clutch actuation arm 142 may be connected to an actuator fork 145 in various orientations as required by the application. A comparison of the relative positions of clutch actuation arm 142 in FIGS. 2 and 7 illustrates this principle. As previously noted with clutch actuation fork 131, the opposite end of clutch actuator fork 145 engages a pivot end 149, which is rotationally supported by a pocket (not shown) in housing element 106. Upon rotation of clutch actuation arm 142, actuator fork 145 pushes input spur gear 144 against washer 139 and disc spring 147 to compress the spring. A thrust washer 137 resides on the opposite side of disc spring 147 to protect the components of clutch assembly 140 and housing element 106. This movement of input spur gear 144 away from output bevel gear 146 disengages projections 146a (as best shown in FIG. 12) on the backside of output bevel gear 146 from corresponding indentations 144a in the face of the input spur gear 144 that contacts actuator fork 145, effectively disengaging gear train 150 from motor output shaft 136. In an application such as a snow thrower, clutch actuation arms 142 and 143 can be engaged to linkages (not shown) to permit the user to separately and selectively control the input to the two axles 154, 155 of drive assembly 100, thereby driving and steering the application.

Axle shaft 154 is supported in axle bearing 156 disposed external to housing 103 and on a separate bearing in housing 103, so that an internal end of axle shaft 154 is disposed adjacent to the hydrostatic transmission. Similarly, an internal end of axle shaft 155 is disposed adjacent to an opposite side of the hydrostatic transmission, thereby reducing the overall size of the unit. An external end of axle shaft 154 extends from axle horn 108.

It will be understood that various internal bearings, seals, fasteners and related hardware are not depicted in the figures or are depicted but not described herein, but the operation and applicability of such hardware is known to a person of skill in the art. Furthermore, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus, comprising:
   a variable speed transmission disposed in a housing and having a transmission input shaft and driving a transmission output shaft;
   a first output gear driven by the transmission output shaft and disposed on a first jack shaft and a second output gear driven by the transmission output shaft and disposed on a second jack shaft;
   a first intermediate gear disposed on a third jack shaft, wherein the first intermediate gear is driven by the first output gear;
   a second intermediate gear disposed on a fourth jack shaft, wherein the second intermediate gear is driven by the second output gear; and
   a first output axle extending out of the housing and driven by the first intermediate gear and a second output axle extending out of the housing and driven by the second intermediate gear.

2. The drive apparatus of claim 1, wherein the first jack shaft and the second jack shaft are both parallel to the transmission output shaft.

3. The drive apparatus of claim 1, further comprising a first axle spur gear fixed on the first output axle and engaged to and driven by the first intermediate gear, and a second axle spur gear fixed on the second output axle and engaged to and driven by the second intermediate gear.

4. The drive apparatus of claim 3, further comprising a first input spur gear driven by the transmission output shaft and selectively engaged to the first output gear, and a second input spur gear driven by the transmission output shaft and selectively engaged to the second output gear.

5. The drive apparatus of claim 1, wherein the first jack shaft and the second jack shaft are both parallel to the transmission output shaft and the third jack shaft and the fourth jack shaft are perpendicular to the transmission output shaft.

6. The drive apparatus of claim 1, wherein the variable speed transmission is a hydraulic transmission comprising a hydraulic motor and a hydraulic pump, and the transmission output shaft is a motor shaft engaged to and driven by the hydraulic motor.

7. The drive apparatus of claim 6, wherein the first jack shaft and the second jack shaft are both parallel to the motor shaft.

8. The drive apparatus of claim 6, wherein the transmission input shaft is a pump input shaft engaged to and driving the hydraulic pump.

9. The drive apparatus of claim 8, further comprising a center section, wherein both the hydraulic pump and the hydraulic motor are disposed on and hydraulically connected through the center section.

10. The drive apparatus of claim 8, wherein the pump input shaft and the motor shaft are coaxial.

11. The drive apparatus of claim 6, further comprising a first axle spur gear fixed on the first output axle and engaged to and driven by the first intermediate gear, and a second axle spur gear fixed on the second output axle and engaged to and driven by the second intermediate gear.

12. The drive apparatus of claim 11, further comprising a first input spur gear driven by the motor shaft and selectively engaged to the first output gear, and a second input spur gear driven by the motor shaft and selectively engaged to the second output gear.

13. The drive apparatus of claim 6, wherein the first jack shaft and the second jack shaft are both parallel to the motor shaft and the third jack shaft and the fourth jack shaft are perpendicular to the motor shaft.

14. The drive apparatus of claim 1, further comprising:
a power take off comprising a power take off output shaft and a clutch/brake mechanism, the clutch/brake mechanism comprising:
a cage engaged to a clutch input hub;
a brake stator engaged to the housing;
a carrier selectively engageable with the cage and alternately selectively engageable with the brake stator;
an output hub engaged to the carrier; and
an actuation fork rotatably disposed in the housing and selectively engageable with the carrier.

15. The drive apparatus of claim 14, further comprising a power take off spring disposed about a proximate end of the power take off output shaft and engaged to the carrier on a first face thereof, wherein the power take off spring biases the carrier toward engagement with the brake stator.

16. The drive apparatus of claim 15, further comprising a clutch plate stack disposed in the cage, wherein the clutch plate stack comprises a first set of clutch plates having a first plurality of teeth forms extending from an interior periphery thereof and engaged to the carrier, and a second set of clutch plates having a second plurality of teeth forms extending from an exterior periphery thereof, and engaged to and driven by the cage, wherein the first set of clutch plates are alternately disposed between the second set of clutch plates.

17. The drive apparatus of claim 14, further comprising a brake rotor disposed on the carrier, wherein the brake rotor frictionally engages the brake stator when the carrier is selectively engaged to the brake stator.

18. The drive apparatus of claim 14, wherein the clutch input hub is disposed on the transmission input shaft.

19. The drive apparatus of claim 14, wherein the variable speed transmission comprises a hydraulic motor and a hydraulic pump, and the transmission input shaft is a pump input shaft engaged to and driving the hydraulic pump, and the transmission output shaft is a motor shaft engaged to and driven by the hydraulic motor.

20. The drive apparatus of claim 19, further comprising:
a power take off spring disposed about a proximate end of the power take off output shaft and engaged to the carrier on a first face thereof, wherein the power take off spring biases the carrier toward engagement with the brake stator;
a clutch plate stack disposed in the cage, wherein the clutch plate stack comprises a first set of clutch plates having a first plurality of teeth forms extending from an interior periphery thereof and engaged to the carrier, and a second set of clutch plates having a second plurality of teeth forms extending from an exterior periphery thereof, and engaged to and driven by the cage, wherein the first set of clutch plates are alternately disposed between the second set of clutch plates; and
a brake rotor disposed on the carrier, wherein the brake rotor frictionally engages the brake stator when the carrier is selectively engaged to the brake stator.

21. The drive apparatus of claim 14, further comprising a first clutch assembly comprising the first output gear and the first intermediate gear, and a second clutch assembly comprising the second output gear and the second intermediate gear, wherein the first clutch assembly is engaged to and selectively drives the first output axle, and the second clutch assembly is engaged to and selectively drives the second output axle.

* * * * *